United States Patent
Talwar (10) Patent No.: US 10,863,359 B2
(45) Date of Patent: Dec. 8, 2020

(54) THIRD-PARTY AUTHORIZATION SUPPORT FOR INTERACTIVE COMPUTING ENVIRONMENT FUNCTIONS

(71) Applicant: Equifax Inc., Atlanta, GA (US)

(72) Inventor: Hrishi Talwar, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 25 days.

(21) Appl. No.: 16/328,595

(22) PCT Filed: Jun. 28, 2018

(86) PCT No.: PCT/US2018/040055
§ 371 (c)(1),
(2) Date: Feb. 26, 2019

(87) PCT Pub. No.: WO2019/006144
PCT Pub. Date: Jan. 3, 2019

(65) Prior Publication Data
US 2020/0205002 A1    Jun. 25, 2020

Related U.S. Application Data

(60) Provisional application No. 62/526,763, filed on Jun. 29, 2017.

(51) Int. Cl.
*H04W 12/08* (2009.01)
*H04L 29/06* (2006.01)
(Continued)

(52) U.S. Cl.
CPC ..... *H04W 12/0804* (2019.01); *H04L 63/0884* (2013.01); *H04L 63/102* (2013.01);
(Continued)

(58) Field of Classification Search
CPC .. H04W 12/0804; H04W 12/06; H04L 63/18; H04L 63/0884; H04L 63/102; H04M 1/72577
See application file for complete search history.

(56) References Cited

U.S. PATENT DOCUMENTS

| 5,960,411 A | 9/1999 | Hartman et al. |
| RE44,513 E | 10/2013 | Nobrega et al. |

(Continued)

FOREIGN PATENT DOCUMENTS

| KR | 20130103697 A | 9/2013 |
| WO | 2006113834 A2 | 10/2006 |

(Continued)

OTHER PUBLICATIONS

PCT/US2018/040055, "International Search Report and Written Opinion", dated Nov. 14, 2018, 12 pages.
(Continued)

*Primary Examiner* — Huan V Doan
(74) *Attorney, Agent, or Firm* — Kilpatrick Townsend & Stockton LLP (57) ABSTRACT

In some aspects, a computing system can obtain, from a host server, a data network identifier that identifies a mobile device involved in an online transaction within an interactive computing environment provided by the host server. The computing system can also obtain, from a telecommunication provider server, a credential corresponding to the data network identifier. The computing system can match the credential to a set of authorization elements. Each authorization element can allow the mobile device to access a function for advancing the online transaction within the interactive computing environment. The computing system can generate a dynamic authorization data structure that includes the authorization elements. The computing system can cause the host server to advance, responsive to receiving
(Continued)

a selection from the mobile device identifying one of the authorization elements, the online transaction within the interactive computing environment.

20 Claims, 3 Drawing Sheets (51) Int. Cl.
*H04W 12/06* (2009.01)
*H04M 1/725* (2006.01)
(52) U.S. Cl.
CPC ............ *H04L 63/18* (2013.01); *H04W 12/06* (2013.01); *H04M 1/72577* (2013.01)

(56) References Cited

U.S. PATENT DOCUMENTS

| | | | |
|---|---|---|---|
| 10,115,102 B2 | 10/2018 | Burrell et al. | |
| 2004/0168054 A1 | 8/2004 | Halasz et al. | |
| 2006/0041755 A1 | 2/2006 | Pemmaraju | |
| 2006/0233332 A1 | 10/2006 | Toms | |
| 2006/0235796 A1 | 10/2006 | Johnson et al. | |
| 2007/0244831 A1 | 10/2007 | Kuo | |
| 2007/0265928 A1 | 11/2007 | Fuchs et al. | |
| 2009/0300097 A1 | 12/2009 | Meyer | |
| 2010/0095359 A1 | 4/2010 | Gordon | |
| 2010/0125737 A1 | 5/2010 | Kang | |
| 2010/0218241 A1 | 8/2010 | Faryna | |
| 2011/0238580 A1 | 9/2011 | Coppinger | |
| 2011/0247045 A1 | 10/2011 | Rajagopal et al. | |
| 2011/0270751 A1* | 11/2011 | Csinger | H04L 63/18 705/42 |
| 2011/0320347 A1 | 12/2011 | Tumminaro et al. | |
| 2012/0203605 A1 | 8/2012 | Morgan et al. | |
| 2012/0240204 A1 | 9/2012 | Bhatnagar et al. | |
| 2012/0300932 A1 | 11/2012 | Cambridge et al. | |
| 2013/0024371 A1 | 1/2013 | Hariramani et al. | |
| 2013/0262311 A1 | 10/2013 | Buhrmann et al. | |
| 2014/0258136 A1 | 9/2014 | Ellis | |
| 2014/0282897 A1 | 9/2014 | Stuntebeck | |
| 2015/0026049 A1 | 1/2015 | Theurer et al. | |
| 2015/0088751 A1 | 3/2015 | Grigg et al. | |
| 2015/0106270 A1 | 4/2015 | Burrell et al. | |
| 2016/0277380 A1 | 9/2016 | Wagner et al. | |
| 2016/0381038 A1 | 12/2016 | Disraeli | |
| 2017/0221055 A1* | 8/2017 | Carlsson | H04L 63/10 |

FOREIGN PATENT DOCUMENTS

| | | |
|---|---|---|
| WO | 2010088757 | 8/2010 |
| WO | 2015057538 | 4/2015 |

OTHER PUBLICATIONS

U.S. Appl. No. 14/512,493, "Final Office Action", dated Apr. 30, 2018, 11 pages.
U.S. Appl. No. 14/512,493, "Non-Final Office Action", dated Jul. 14, 2017, 17 pages.
U.S. Appl. No. 14/512,493, "Notice of Allowance", dated Jun. 29, 2018, 18 pages.
AU2014334713, "First Examination Report", dated May 1, 2019, 4 pages.
EP14853685.7, "Extended European Search Report", dated Mar. 10, 2017, 7 pages.
EP14853685.7, "Office Action", dated Sep. 13, 2018, 7 pages.
EP14853685.7, "Summons to Attend Oral Proceedings", dated Aug. 13, 2019, 10 pages.
PCT/US2014/060217, "International Search Report and Written opinion", dated Jan. 12, 2015, 11 pages.
PCT/US2018/027518, "International Search Report and Written Opinion", dated Jul. 26, 2018, 17 pages.
PCT/US2018/040055, "International Preliminary Report on Patentability", dated Jan. 9, 2020, 8 pages.
PCT/US2018/065376, "International Search Report and Written Opinion", dated Mar. 25, 2019, 14 pages.

* cited by examiner

THIRD-PARTY AUTHORIZATION SUPPORT FOR INTERACTIVE COMPUTING ENVIRONMENT FUNCTIONS

CROSS REFERENCE TO RELATED APPLICATIONS

This disclosure claims the benefit of priority of U.S. Provisional Application No. 62/526,763 and filed on Jun. 29, 2017, which is hereby incorporated in its entirety by this reference.

TECHNICAL FIELD

This disclosure relates generally to information security for controlling access or authentication using credentials, and more particularly to providing third-party authorization support for online transactions or other restricted functions within an interactive computing environment.

BACKGROUND

Interactive computing environments, such as web-based applications or other online software platforms, allow users to perform various computer-implemented functions through graphical interfaces. A given interactive environment can allow a user device to access different graphical interfaces providing different types of functionality, such as searching databases for different content items, selecting the content items by storing them in a temporary memory location, and causing a server to perform one or more operations based on a selected combination of content items.

SUMMARY

Certain aspects involve providing third-party authorization support to an interactive computing environment. In one example, a computing system can obtain, from a host server, a data network identifier that identifies a mobile device involved in an online transaction within an interactive computing environment provided by the host server. The computing system can also obtain, from a telecommunication provider server, a credential corresponding to the data network identifier. The computing system can match the credential to a set of authorization elements. Each authorization element can allow the mobile device to access a function for advancing the online transaction within the interactive computing environment. The computing system can generate a dynamic authorization data structure that includes the authorization elements. The computing system can cause the host server to advance, responsive to receiving a selection from the mobile device identifying one of the authorization elements, the online transaction within the interactive computing environment.

BRIEF DESCRIPTION OF THE FIGURES

Various features, aspects, and advantages of the present disclosure are better understood by reading the Detailed Description with reference to the accompanying drawings.

DETAILED DESCRIPTION

As described herein, certain embodiments provide improvements to interactive computing environments by solving data-security problems that are specific to online platforms hosted by a server system and accessed by mobile devices. For example, a host server may restrict access to a function for advancing an online transaction or other operation within an interactive computing environment. To obtain access to this function, a mobile device must often submit one or more authorization elements to the host server. In existing systems, one or more authorization elements must be stored on the mobile device, which may lack security features for preventing unauthorized access to the authorization elements. Additionally or alternatively, existing techniques may involve the mobile device transmitting an entire authorization element to the host server. If the mobile device transmits the credential without appropriate wireless security, such as a public wireless network, the authorization element could be intercepted by a third-party device and used by the third-party device to gain illicit or unauthorized access to the function within the interactive computing environment. Additionally or alternatively, existing techniques may involve entering the authorization element into the mobile device via an input device, such as a keyboard or microphone, which renders the authorization element susceptible to undetected theft via keystroke logging software or nearby microphones. Thus, wireless communications involving the Internet or other data network can reduce the security of sensitive data used to access features of an interactive computing environment.

Aspects and examples are disclosed for using an identification-and-authorization system to perform third-party authorization support for online transactions (e.g., via a mobile website or other mobile application) between host server systems and mobile devices that access interactive computing environments provided by the host server systems. The identification-and-authorization system can communicate both with host server systems, which are accessed by mobile devices, and with telecommunication providers, which allow mobile devices to communicate via data networks. In some aspects, the identification-and-authorization system can perform third-party authorization support by identifying authorization elements that can provide a mobile device with access to a function for advancing the online transaction within the interactive computing environment. The identification-and-authorization system can generate and securely transmit one or more control signals to a host server. A control signal can include the identified set of authorization elements. The control signal can cause the host server to present, within the interactive computing environment, an interface with selectable elements that allow a mobile device to select one of the authorization elements. In one example, the interface can include selectable elements having masked, obscured, or otherwise transformed versions of the authorization elements. Selecting one of these elements can cause the host server system to use the authorization element to provide the mobile device with access to a function within the interactive computing environment, thereby advancing the state of the interactive computing environment.

Some examples of these aspects can overcome one or more of the issues identified above by allowing a mobile device to use an authorization element within an interactive computing environment without the authorization having to be entered at, stored within, or transmitted by the mobile computing device. In one example, a secure identification-and-authorization system, rather than a potentially insecure mobile device, can provide a set of authorization elements to a host server via system-to-system communications. Enhanced security provided by these system-to-system communications can reduce or eliminate the risk of third-party devices intercepting an authorization element from an insecure wireless transmission by a mobile device. In another example, a host server system can auto-populate an interface from the interactive computing environment with the set of authorization elements. This auto-population can reduce the need for a user to manually enter one or more authorization element into the mobile device, which can likewise reduce opportunities for theft of the authorization element via keyboard-logging software or other technologies used to clandestinely steal sensitive information. In another example, using the host server to present the set of authorization elements via an interface can allow the host server to limit the amount of time that the authorization elements are present on the mobile device, thereby reducing the exposure of the authorization element via the mobile device. For instance, the host server can cause a client application on the mobile to delete the authorization elements from any memory of the mobile device after an authorization element has been used to access a particular function within the interactive computing environment. In another example, using the host server to present masked or otherwise transformed versions of authorization elements via an interface can obviate the need to store the authorization elements on the mobile device for any length of time. In this manner, security of the authorization elements and the interactive computing environment is maintained even if the interactive computing environment is accessed by an insecure mobile device, via insecure network communications, or both.

In accordance with some aspects, the identification-and-authorization system can provide a communication point-of-interface between various independent host server systems and independent telecommunication providers. For example, the identification-and-authorization system, which may be used by a host server system, can service requests from different host server systems for authorization elements or other identification information required for accessing various functions within interactive computing environments. The identification-and-authorization system can service these requests using data network identifiers. The data network identifiers can identify mobile devices (e.g., a smart phone, tablet, e-reader, or laptop computer) involved in online transactions with interactive computing environments. Non-limiting examples of a data network identifier include an internet protocol ("IP") address assigned to a mobile computing device, a telephone number of a smart phone, etc. In some aspects, a mobile device may identify a user of the mobile via biometrics, data entry, or any other suitable process for identifying a user of a mobile device. The interactive computing environments, which are provided by host server systems, can be accessed via online services of the host server systems using a web browser, a dedicated mobile application, or other client applications executed on a mobile device.

In some aspects, using the identification-and-authorization system as an interface between the host server system and a telecommunication provider facilitates third-party authorization support in real time (e.g., between commencement and completion of an online transaction). For example, during a given transaction, the identification-and-authorization system can transmit a request to a telecommunication provider to provide a credential that is associated with a user of the mobile device. The identification-and-authorization system can receive, from the telecommunication provider, a response identifying the credential. The identification-and-authorization system can use the credential to retrieve authorization elements or other identification data associated with the user. The identification-and-authorization system can analyze the authorization elements to determine a subset of the authorization elements that are valid for the online transaction or otherwise usable for providing the mobile device with access to a function that advances the online transaction within the interactive computing environment. The identification-and-authorization system can provide the valid set of authorization elements to the host server system, the mobile device, or both for completing the online transaction or otherwise advancing the state of the interactive computing environment. In some aspects, the set of authorization elements can include multiple elements, and the identification-and-authorization system or the host server system can provide the elements in an order based on a preference of the user, the host server system, or an order that is quicker to examine by a user.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Example of an Operating Environment

Figure 1:
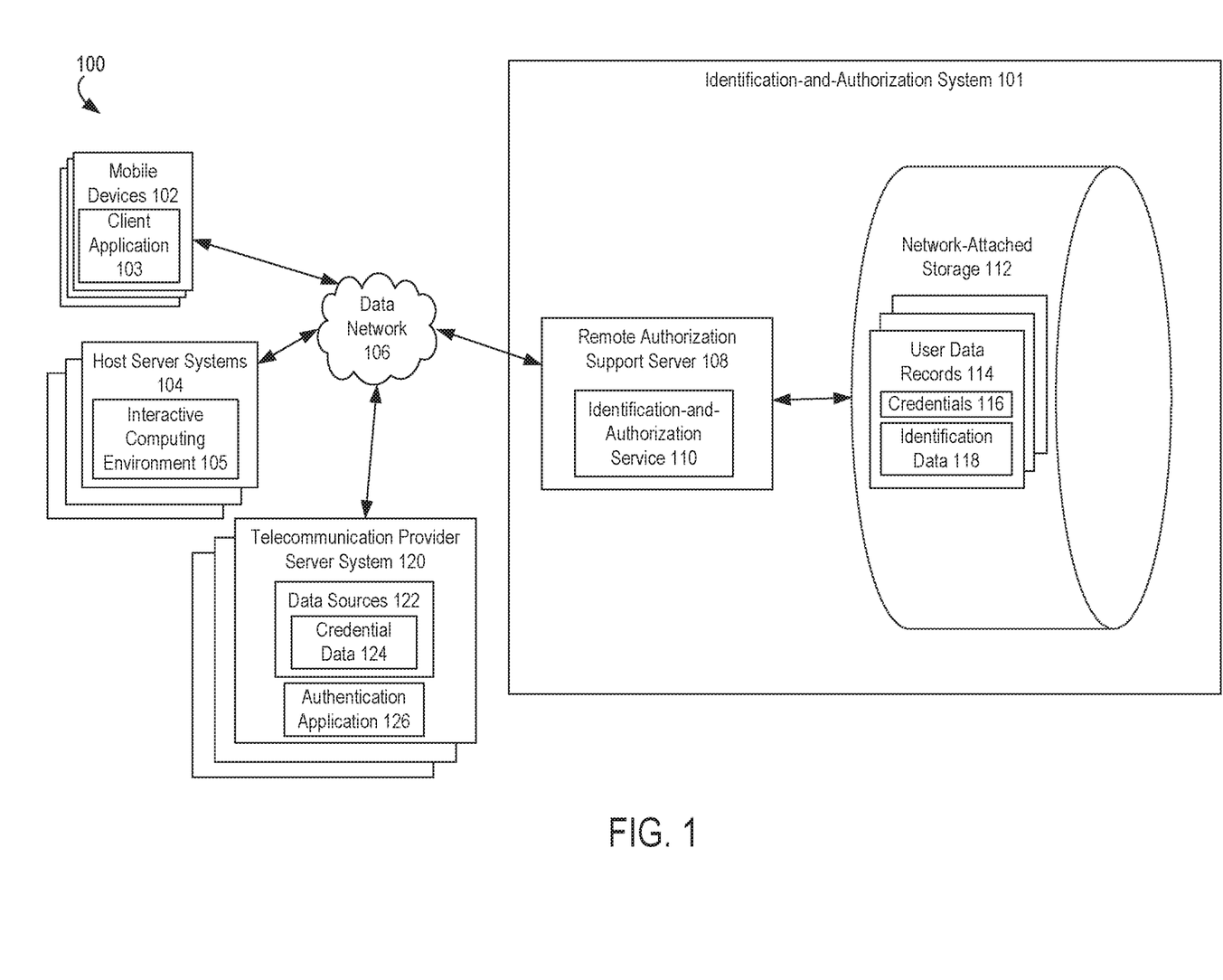
FIG. 1 depicts an example of an identification-and-authorization system communicatively coupled to mobile devices, host server systems, and telecommunication provider server systems according to one aspect of the present disclosure.

Referring now to the drawings, FIG. 1 depicts an example of a computing system 100 in which an identification-and-authorization system 101 provides third-party authorization support in online transactions with host server systems 104. The computing system 100 can include the identification-and-authorization system 101, one or more mobile devices 102, one or more host server systems 104, and one or more telecommunication provider server systems 120. The identification-and-authorization system 101 is a specialized computing system that may be used for performing large amounts of third-party authorization support, identity verification, and other operations using a large number of computer processing cycles.

The identification-and-authorization system 101 can communicate with one or more host server systems 104. In some examples, host server systems 104 can send data to the remote authorization support server 108 to be processed or can send signals to the remote authorization support server 108 that control or otherwise influence different aspects of the identification-and-authorization system 101 or the data it is processing. The host server systems 104 can interact with the remote authorization support server 108 via one or more data networks 106. The host server systems 104 may also interact with the mobile devices 102 via one or more data networks 106 to facilitate online transactions between users of the mobile devices 102 and interactive computing environments 105 that are hosted by, provided by, or otherwise associated with the host server systems 104.

Each host server system 104 may include one or more third-party devices (e.g., computing devices or groups of computing devices), such as individual servers or groups of servers operating in a distributed manner. A host server system 104 can include any computing device or group of computing devices used by an operator. Examples of operators includes sellers, lenders, or other provider of products or services.

A host server system 104 can include one or more server devices. The one or more server devices can include or can otherwise access one or more non-transitory computer-readable media. The host server system 104 can also execute an interactive computing environment 105. The interactive computing environment 105 can include executable instructions stored in one or more non-transitory computer-readable media. The host server system 104 can further include one or more processing devices that can execute instructions providing the interactive computing environment 105 to perform, in real time during an online transaction between a mobile device 102 and the host server system 104, operations described herein. In some aspects, the executable instructions for the interactive computing environment 105 can include instructions that provide one or more graphical interfaces. The graphical interfaces are used by a mobile device 102 to access various functions of the interactive computing environment 105. For instance, the interactive computing environment 105 may transmit data to and receive data from the client application 103 to shift between different states of interactive computing environment 105, where the different states allow one or more electronics transactions between the mobile device 102 and the host server system 104 to be performed.

Each communication within the identification-and-authorization system 101 (e.g., between mobile devices 102 and the remote authorization support server 108, between host server systems 104 and the remote authorization support server 108, etc.) may occur over one or more data networks 106. A data network 106 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network 106.

A data network 106 may include network computers, sensors, databases, or other devices that may transmit or otherwise provide data to remote authorization support server 108. For example, a data network 106 may include local area network devices, such as routers, hubs, switches, or other computer networking devices. The data networks 106 can be incorporated entirely within (or can include) an intranet, an extranet, or a combination thereof. In one example, communications between two or more systems or devices can be achieved by a secure communications protocol, such as secure Hypertext Transfer Protocol ("HTTP") communications that use secure sockets layer ("SSL") or transport layer security ("TLS"). In addition, data or transactional details communicated among the various computing devices may be encrypted.

The identification-and-authorization system 101 can include one or more remote authorization support servers 108. A remote authorization support server 108 may be a specialized computer or other machine that processes the data received within the identification-and-authorization system 101. The remote authorization support server 108 may include one or more other systems. For example, the remote authorization support server 108 may include a database system for accessing the network-attached storage unit 112, a communications grid, or both. A communications grid may be a grid-based computing system for processing large amounts of data.

In some aspects, the remote authorization support server 108 can allow the identification-and-authorization system 101 to be an interface between various host server systems 104 and various telecommunication provider server systems 120. This architecture can facilitate the real-time provision of information from the identification-and-authorization system 101 to host server systems 104. This provision of information facilitates completion of online transactions, prevention of fraudulent transactions, or both in real time. Real time operation could involve performing the relevant operations, such as third-party authorization support, during an online transaction between the host server system 104 and a mobile device 102. For instance, real time operation could include receiving a request for one or more authorization elements during a session or online transaction within the interactive computing environment and servicing the request prior to completion of the transaction or session.

The remote authorization support server 108 can include one or more processing devices that execute program code, such as an identification-and-authorization service 110. The program code is stored on a non-transitory computer-readable medium. The identification-and-authorization service 110 can execute one or more processes for facilitating third-party authorization support and other aspects of online transactions between mobile devices 102 and host server systems 104 via interactive computing environments 105. The identification-and-authorization service 110 can include executable instructions stored in one or more non-transitory computer-readable media. In some aspects, the identification-and-authorization service 110 can include one or more modules, such as a web server module, a web services module, or an enterprise services module, which individually or in combination facilitate online transactions. For example, a web server module can be executed by a suitable processing device to provide one or more web pages or other interfaces to a mobile device 102, a host server system 104, or a telecommunication provider server system 120. The web pages or other interfaces can include content provided by the web services module. The web services module can generate this content by executing one or more algorithms using information retrieved from one or more of the user data records 114. The enterprise services module can be executed to retrieve the information from one or more of the user data records 114.

The identification-and-authorization system 101 may also include one or more network-attached storage units 112. The network-attached storage unit 112 may store a variety of different types of data organized in a variety of different ways and from a variety of different sources. For example, the network-attached storage unit 112 may include storage other than primary storage located within remote authorization support server 108 that is directly accessible by processors located therein. In some aspects, the network-attached storage unit 112 may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The network-attached storage unit 112 can include memory devices for storing user data records 114 that include credentials 116 and identification data 118. The user data records 114 can be received by a remote authorization support server 108 via a data network 106, generated by the remote authorization support server 108 based on communications with mobile devices 102, generated by the remote authorization support server 108 based on communications with host server systems 104, or some combination thereof. The user data records 114 can be stored in, for example, a database, or other suitable data source. Suitable data sources can include, for example, secure and credentialed databases or other data structures managed by or otherwise accessible by the identification-and-authorization service 110.

The user data records 114 can include identification data 118. Identification data 118 can include any information that can be used to uniquely identify an individual or other entity. In some aspects, identification data 118 can include information that can be used on its own to identify an individual or entity. Non-limiting examples of such identification data 118 include one or more of a legal name, a company name, a social security number, a credit card number, a date of birth, an e-mail address, etc. In other aspects, identification data 118 can include information that can be used in combination with other information to identify an individual or entity. Non-limiting examples of such identification data 118 include a street address or other geographical location, employment data, etc. In some aspects, information from the user data records 114 can be processed to generate derived data about a user (e.g., risk assessments, credit scores, etc.).

Each credential 116 can include information that can be used to uniquely identify a source of identification data regarding an individual or other entity. The identification data can include one or more authorization elements associated with a mobile device 102 or a user of a mobile device 102. Non-limiting examples of an authorization element include one or more of a digital certificate, an access token, a credit card number or other payment option, an authentication credential such as a user name or password, etc. In some aspects, a credential 116 can include information that can be used on its own to identify the data source including identification data. Non-limiting examples of such a credential 116 include one or more of an account number, a legal name, an address, a social security number, a credit card number, etc.

In some aspects, the identification data 118 can include credit data. Credit data can include data associated with a user's credit file. A credit file can be a historical report that is prepared or provided by a credit bureau. For example, a credit file can include one or more of identification data, a credit card account, a loan, a bankruptcy, a late payment, an inquiry, a credit score, a credit card number, etc. In some aspects, a credit file can include additional data from data sources other than credit reporting data to augment the credit reporting data. Non-limiting examples of such additional data include information obtained from utility providers, information obtained from wireless service providers, information obtained from credit card issuers, real estate data, etc. The user data records 114 can also include account data. Account data can include data associated with a user's credit account. For example, account data can include a user's name, address, an account number, authentication information (e.g., a personal identification number, a password, etc.), a username, etc. The user data records 114 can further include lender data. Lender data can include data associated with lenders of credit or money, or other financial product or service providers. For example, lender data can include data associated with a bank, trust, credit union, insurance company, brokerage firm, etc. The user data records 114 can also include any other relevant data, such as income and employment data, asset data, education data, etc. In some aspects, data from multiple user data records 114 can be linked to or otherwise associated with a given user using a referential keying system. The user data records 114 can be updated periodically or continuously.

In some aspects, the identification-and-authorization service 110 can execute one or more processes for validating identification data (e.g., a payment source). In some aspects, the identification-and-authorization service 110 can configure the identification-and-authorization service 110 to obtain transaction data about an online transaction from a host server system 104. In additional or alternative aspects, the identification-and-authorization service 110 can compare credit data or account data with transaction data provided by one or more of the mobile device 102 or the host server system 104. The identification-and-authorization service 110 can use the results of the comparison to determine a subset of the identification data 118 that is valid for granting access to a function for completing or otherwise advancing an online transaction. For example, the remote authorization support server 108 can receive transaction data indicating that an online transaction requires satisfaction of one or more validation conditions. Examples of validation conditions include a user name or password having sufficient permissions for accessing a portion of the interactive computing environment 105, a credit card having a credit limit above a threshold amount, a credit card being unexpired, an access token having a time-to-live that is less than a specified expiration duration, etc. The identification-and-authorization service 110 can verify that at least some authorization elements included in the identification data 118 satisfying one or more validation conditions are part of the valid identification data being provided to the host server system 104.

In additional or alternative aspects, the identification-and-authorization service 110 can provide the host server system 104 with one or more authorization elements from the identification data 118 associated with the mobile device 102 along with an order for displaying the authorization elements. For instance, the identification-and-authorization service 110 can determine the order based on a preference of the user received from one of the mobile devices 102 associated with the user or the telecommunication provider server system 120, past preferences of the user, quickness and ease of selection by a user, etc. In one example, the identification-and-authorization service 110 can determine that a user uses a first authorization element (e.g., a credit card) more often than another authorization element. For instance, the user data records 114 can identify uses of the authorization elements and associated dates of use. Authorization elements having the most uses over a certain time period (e.g., the last three months, the last six months, all available dates, etc.) can be positioned based on that usage (e.g., higher in the order based on apparent user preference, lower in the order to induce more usage of low-frequency elements, etc.). The identification-and-authorization service 110 can provide the authorization elements for display at the mobile device 102, either via the host server system 104 or directly, such that a user of the mobile device 102 can more quickly and easily select authorization elements that are listed higher in the order. In some aspects, the identification-and-authorization service 110 can provide the host server system 104 with a warning if one or more authorization data elements or other identification data 118 is determined to be invalid for completing the online transaction.

A mobile device 102 can include any computing device or other communication device operated by a consumer, a buyer, or other user. The mobile device 102 can include one or more client applications 103. A client application 103 can include executable instructions stored in one or more non-transitory computer-readable media. The mobile device 102 can also include one or more processing devices that are capable of executing the client application 103 to perform operations described herein. In some aspects, the client application 103 can provide an interface (e.g., a web browser or a mobile application) through which a user can engage access the interactive computing environment 105. For instance, the user or other entity accessing the mobile device 102 can use the client application 103 to query a set of sensitive or other controlled data, to engage in an online purchase transaction with a host server system 104 via an interactive computing environment 105, to access a certain content-modification feature of an online tool, etc. Examples of the interactive computing environment 105 include a mobile application, a web-based application accessible via mobile device, etc.

A telecommunication provider server system 120 can include any computing device or group of computing devices operated by a telecommunication or wireless network provider. The telecommunication provider server system 120 can include one or more server devices. The one or more server devices can include or can otherwise access one or more non-transitory computer-readable media. The telecommunication provider server system 120 can communicate with one or more access points (e.g., base stations, microcells, etc.) used by the telecommunication provider server system 120 to provide telecommunication service to the mobile device 102.

The telecommunication provider server system 120 can also include one or more processing devices that are capable of executing an authentication application 126 to perform operations described herein. The authentication application 126 and one or more data sources 122 can be stored in one or more non-transitory computer-readable media. The data sources 122 can have any of the structures or configurations described with respect to the user data records 114 of the identification-and-authorization system 101.

In some aspects, the authentication application 126 can provide an application programming interface through which the identification-and-authorization system 101 can query the telecommunication provider server system 120 and thereby acquire credential data 124. Credential data 124 can include data associated with a telecommunication account (e.g., a user's telecommunication account). For example, credential data 124 can include a legal name, a social security number, a credit card number, an account number, an address, a mobile phone number, a mobile account number, a proxy to a mobile account number, etc. The identification-and-authorization system 101 can compare the received credential data 124 with one or more credentials 116 of the user data records 114 to obtain identification data 118 about a particular individual or entity.

In some aspects, the identification-and-authorization system 101 can implement one or more procedures to secure communications between the identification-and-authorization system 101 and a mobile device 102, host server system 104, or a telecommunication provider server system 120. Non-limiting examples of features provided to protect data and transmissions between the identification-and-authorization system 101 and the mobile device 102, host server system 104, or the telecommunication provider server system 120 include secure web pages, encryption, firewall protection, network behavior analysis, intrusion detection, etc. In some aspects, transmissions with mobile devices 102, host server systems 104, or telecommunication provider server systems 120 can be encrypted using public key cryptography algorithms using a minimum key size of 128 bits. In additional or alternative aspects, website pages can be delivered through HTTPS or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

The identification-and-authorization system 101 can communicate with one or more mobile devices 102, host server systems 104, and telecommunication provider server systems 120 by applying authentication and authorization rules. The authentication and authorization rules can be used to authenticate and authorize the mobile device 102, host server system 104, or telecommunication provider server system 120 to receive information from the identification-and-authorization system 101.

In some aspects, the identification-and-authorization system 101 can communicate with the various telecommunication provider server systems 120 in a manner that is out of band with respect to the host server systems 104, the mobile devices 102, or both. For example, the communications between the identification-and-authorization system 101 and a telecommunication provider server system 120 can be performed via a separate communication channel, session, or both as compared to the communication channel or session established between the identification-and-authorization system 101 and a host server system 104. By using out-of-band communication channels, the network communications port can communicate with the mobile device 102, the host server system 104, and other systems substantially simultaneously during an electronic transaction while preventing these various devices and systems from directly communicating.

In some aspects, the identification-and-authorization system 101 communicating separately with the host server system 104 and the telecommunication provider server system 120 provides an improvement over typical systems. In one example, typical systems would rely solely on data provided from the mobile device to a host server system. This transmitted data may lack specific data needed to query a telecommunication provider system regarding a user of a mobile device. By contrast, the identification-and-authorization system 101 provides access to a large amount of data from user data records 114 that can be used to query a telecommunication provider server system 120. The identification-and-authorization system 101 can match data transmitted from the mobile device 102 (e.g., a telephone number) to one or more additional sets of data usable for querying a telecommunication provider server system 120. Examples of such query parameters include an entity identifier generated by the identification-and-authorization system 101 for tracking a common entity across multiple user data records 114, a full name, social security number, billing address, etc. This additional data can be kept confidential from the host server system 104 due to the identification-and-authorization system 101 communicating with the telecommunication provider server system 120 in a manner that is out of band with respect to the communication between the identification-and-authorization system 101 and the host server system 104. Thus, the computing system 100 allows for more accurate queries to a telecommunication provider server system 120 for third-party authorization support while maintaining the security of sensitive data hosted by the identification-and-authorization system 101.

The numbers of devices depicted in FIG. 1 are provided for illustrative purposes. Different numbers of devices may be used. For example, while certain devices or systems (e.g., a remote authorization support server 108, a network-attached storage unit 112, etc.) are shown as single devices in FIG. 1, multiple devices may instead be used to implement these devices or systems (e.g., a cloud or grid-based telecommunication network server system, a group of network-attached storage devices, etc.).

Example of Third-Party Authorization Support Operations

Figure 2:
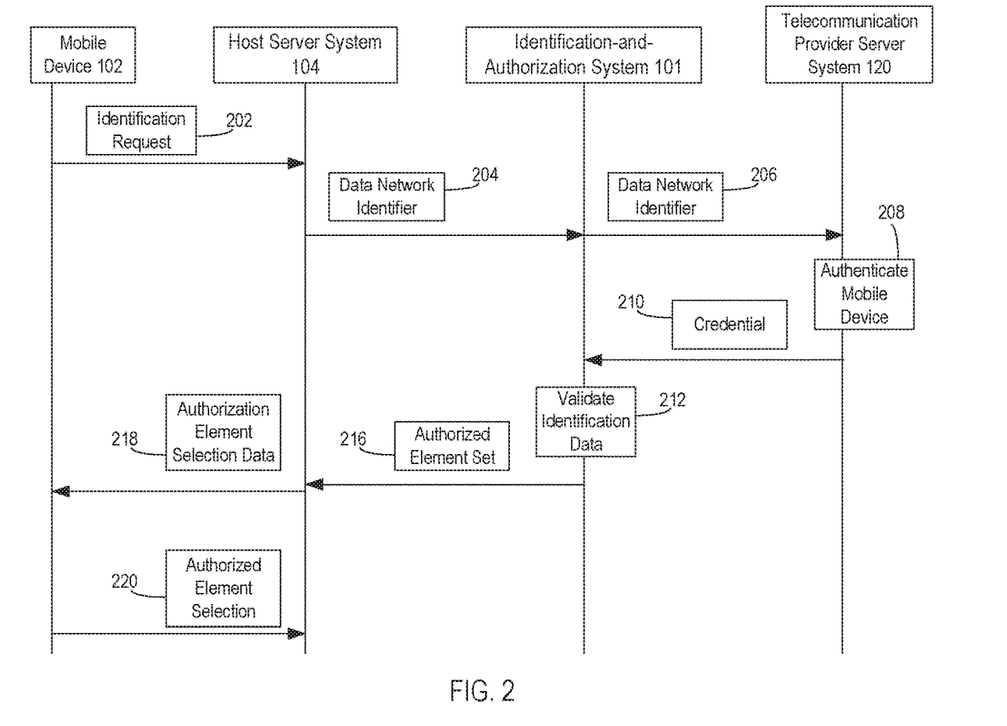
FIG. 2 depicts an example of interactions during an online transaction that includes third-party authorization support according to one aspect of the present disclosure.

FIG. 2 depicts examples of interactions among a mobile device 102, a host server system 104, an identification-and-authorization system 101, and a telecommunication provider server system 120 during a transaction. In this example, the mobile device 102 transmits a communication 202 to the host server system 104. The communication 202 can be transmitted during a session between a client application 103, which is executed on the mobile device 102, and an interactive computing environment 105, which is executed on the host server system 104. The mobile device 102 is used to perform one or more online transactions with the host server system 104 during the session.

The communication 202 includes an identification request for a user of the mobile device 102. The identification request includes, for example, a request to authenticate the user, a request to retrieve identification data 118 about the user for completion of an online transaction during the session, or some combination thereof. For instance, the identification request can be generated by clicking, in an interface provided by the interactive computing environment 105, an option to use authentication or identification services provided by the identification-and-authorization system 101.

The host server system 104 transmits a communication 204 to the identification-and-authorization system 101. The communication 204 includes a data network identifier and a request for information about the user of the mobile device 102. The data network identifier can be obtained by the interactive computing environment 105 via communications with the client application 103.

A data network identifier can include any information usable for uniquely identifying a computing device (e.g., a mobile device) on a data network. In some aspects, a data network identifier can include information that can be used on its own to identify a computing device (e.g., an IP address). In other aspects, a data network identifier can include information that can be used in combination with other information to identify a computing device.

The identification-and-authorization system 101 transmits a communication 206 to the telecommunication provider server system 120. The communication 206 includes the data network identifier received from the host server system 104. The telecommunication provider server system 120 performs one or more operations 208 for authenticating the mobile device 102.

If the telecommunication provider server system 120 successfully authenticates the mobile device 102, the telecommunication provider server system 120 transmits a responsive communication 210 to the identification-and-authorization system 101. In some aspects, the communication 210 includes credential data 124 for a user of the mobile device 102, as depicted in FIG. 2.

The identification-and-authorization system 101 performs one or more operations 212 for validating identification data 118, such as authorization elements, associated with the mobile device 102. In some examples, the identification data 118 is retrieved from one or more user data records 114. The identification-and-authorization system 101 can analyze the identification data 118 to determine a subset of the identification data 118 that is valid identification data for the online transaction. Transaction data indicating information about the online transaction can be included in communication 204. The information about the online transaction can include one or more validation conditions required for providing access to a function within the interactive computing environment 105 that advances an online transaction. Examples of validation conditions include an unexpired access token, an unexpired credit card, a user name with sufficient access permission, a credit card with a sufficient credit balance, etc. In additional or alternative aspects, the transaction data can be received by the identification-and-authorization system 101 via a separate communication. For example, the identification-and-authorization system 101 can transmit a communication to the host server system 104 requesting the transaction data after receiving communication 210.

In some aspects, the valid identification data can include a portion of the identification data 118 that is capable of being used to complete the online transaction. For example, the valid identification data can include a valid authorization element (e.g., an unexpired access token, an unexpired credit card, a user name with sufficient access permission, a credit card with a sufficient credit balance). In additional or alternative aspects, the valid identification data can include an ordering of valid options for authorization elements. For example, the valid identification data can include a list of valid authorization elements sorted based on user preference, prior use, or host system preference.

In some aspects, the identification-and-authorization system 101 transmits a communication 216 to the host server system 104, as depicted in FIG. 2. The communication 216 includes the validated set of authorization elements retrieved from one or more user data records 114. The validated set of authorization elements can include a single authorization element or multiple authorization elements.

The host server system 104 can transmit a communication 218 to the mobile device 102. The communication 218 can include authorization element selection data. Examples of the authorization element selection data can include the validated set of authorization elements, masked versions of the validated set of authorization elements, other transformed versions of the validated set of authorization elements, graphics representing the set of authorization elements, etc. A masked version of an authorization element can include an unaltered portion of the authorization element along with a portion of the authorization element replaced with other characters, where a masked version of the authorization element "123456" could be "*456" or "123*." A transformed version of an authorization element can include encrypting an authorization element, obscuring the authorization element, or replacing the authorization element with a clue (e.g., identifying a particular credit card by the name of the issuing bank). Graphics representing the set of authorization elements could include, for example, pictures of individuals corresponding to user names, logos of banks that issue credit cards, etc.

In one example of the communication 218, a selection interface provided by an interactive computing environment 105 can be auto-populated with at least some of the authorization element selection data. The host server system 104 can transmit the updated selection interface to the mobile device 102 for use in the online transaction between the host server system 104 and the mobile device 102. The updated selection interface can include one or more control elements for selecting one or more authorization element selection data elements (e.g., a particular credit card). The mobile device 102 can be used to select an authorization element selection data element. Selecting an authorization element selection data element can cause the mobile device 102 to transmit a communication 220 to the host server system 104. The communication 220 can include an authorization element selection indicating which authorization element selection data element was selected at the mobile device 102. The host server system 104 can respond to receiving the selection of an authorization element from the mobile device 102 by advancing an online transaction within the interactive computing environment 105.

In additional or alternative aspects, the identification-and-authorization system 101 transmits the validated identification data directly to the mobile device 102 (e.g., via a communication channel separate from communication channels between the host server system 104 and the mobile device 102 or between the host server system 104 and the identification-and-authorization system 101). The mobile device 102 can insert at least some of the validated identification data into an interface provided by the interactive computing environment 105 for use in the online transaction between the host server system 104 and the mobile device 102. For instance, the mobile device 102 can transmit a communication 220 that causes the host server system to advance the online transaction, as described in the example above.

Figure 3:
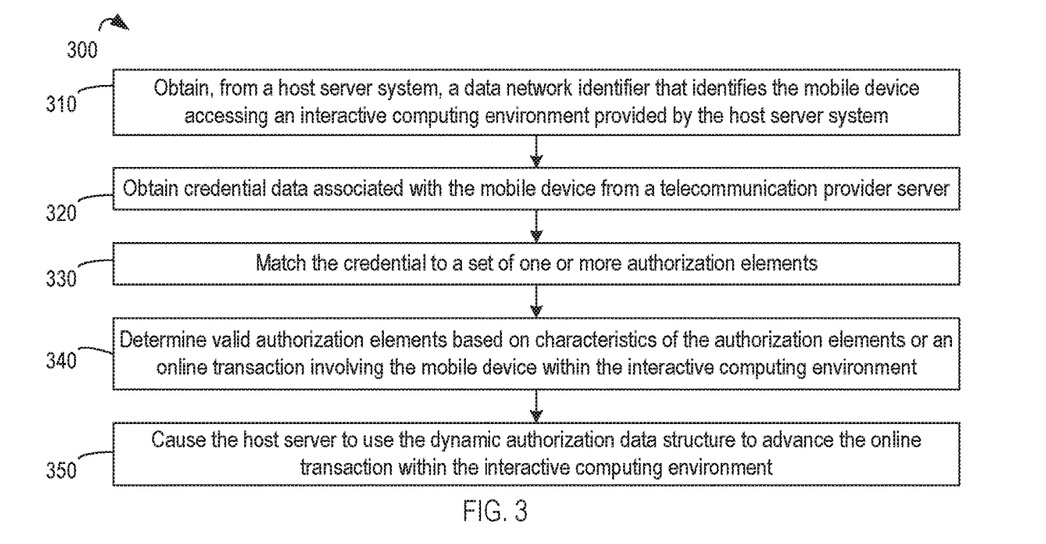
FIG. 3 depicts an example of a process for validating identification data in online transactions according to one aspect of the present disclosure.

FIG. 3 is a flow chart illustrating an example of a process 300 for using the identification-and-authorization system 101 to perform third-party authorization support in online transactions between mobile devices 102 and host server systems 104. For illustrative purposes, the process 300 is described with reference to implementations described above with respect to FIGS. 1 and 2. Other implementations, however, are possible. In some aspects, the steps in FIG. 3 may be implemented in program code that is executed by one or more computing devices, such as the remote authorization support server 108 depicted in FIG. 1. In some aspects, one or more operations shown in FIG. 3 may be omitted or performed in a different order. Similarly, additional operations not shown in FIG. 3 may be performed.

The process 300 involves obtaining, from a host server system, a data network identifier that identifies a mobile device accessing an interactive computing environment provided by the host server system, as depicted at block 310. For example, the host server system 104 can establish a first communication channel with the remote authorization support server 108, or vice versa. The remote authorization support server 108 can receive, via the first communication channel, a data network identifier that identifies a mobile device 102. The data network identifier can be associated with a mobile device 102 conducting a transaction with a host server system 104 via an interactive computing environment 105.

The remote authorization support server 108 can execute the identification-and-authorization service 110 and thereby perform one or more operations for receiving the data network identifier. For example, the identification-and-authorization service 110 can open a server port or transmit a query to the host server system 104 executing the interactive computing environment 105. The host server system 104 can responsively transmit a data network identifier to the identification-and-authorization system 101 via the data network 106. In some aspects, the host server system 104 can "push" (i.e., transmit data without specifically receiving a request for the data) the data network identifier to the identification-and-authorization system 101.

The process 300 also involves obtaining credential data associated with the mobile device from a telecommunication provider server, as depicted at block 320. The remote authorization support server 108 can execute the identification-and-authorization service 110 and thereby perform one or more operations for obtaining credential data. For instance, the remote authorization support server 108 can establish a second communication channel with the telecommunication provider server system 120, or vice versa. The remote authorization support server 108 can obtain, from communications with the telecommunication provider server system 120 and via the second communication channel, a credential corresponding to the data network identifier. In some aspects, the remote authorization support server 108 can communicate with the host server system 104 over the first communication channel and with the telecommunication provider server system 120 over the second communication channel during the same time period. For instance, at least part of a session between the remote authorization support server 108 and the host server system 104 over the first communication channel can overlap at least part of a session between the remote authorization support server 108 and the telecommunication provider server system 120 over the second communication channel.

In one example, the identification-and-authorization service 110 can configure a network interface device to transmit data associated with the data network identifier to a telecommunication provider server system 120. The identification-and-authorization service 110 can establish and transmit the data to the telecommunication provider server system 120 over a secure data connection or other communication channel, which is out of band with respect to a communication channel used by the identification-and-authorization service 110 with respect to the host server system 104. The telecommunication provider server system 120 can receive the data network identifier.

In some aspects, the telecommunication provider server system 120 can use the data network identifier to identify associated credential data from one or more data sources 122. For instance, the telecommunication provider server system 120 can receive a data network identifier including an IP address and determine associated credential data including a social security number. The telecommunication provider server system 120 can transmit the credential data to the identification-and-authorization system 101. The telecommunication provider server system 120 can also transmit other information to the identification-and-authorization system 101. The other information can include an account status (active, suspended, blacklisted, etc.), a mobile phone number, Subscriber Identity Module ("SIM") card information, etc.

The process 300 also involves matching the credential to a set of one or more authorization elements, as depicted at block 330. The remote authorization support server 108 can execute the identification-and-authorization service 110 and thereby perform one or more operations for determining the payment data.

In an illustrative example, the remote authorization support server 108 can retrieve identification data 118 including authorization elements (e.g., access tokens, digital certificates, payment data, etc.) from a user data record 114 by matching the received credential data 124 with one or more credentials 116. The identification-and-authorization service 110 can compare the credential data 124 received from the telecommunication provider server system 120 with the one or more credentials 116 stored in the network-attached storage unit 112. The identification-and-authorization service 110 can identify, based on the comparison, one or more associated user data record 114 that include a corresponding credential 116. The identification-and-authorization service 110 can retrieve one or more authorization elements from the user data record 114. An authorization element can provide the mobile device 102 with access to a function for advancing the online transaction within the interactive computing environment 105. As a simplified example, such a function could include completing an online transaction using an authorization element such as payment information.

The process 300 also involves generating a dynamic authorization data structure that includes a set of authorization elements. The remote authorization support server 108 can execute the identification-and-authorization service 110 and thereby perform one or more operations that involve determining the valid payment data. For example, the remote authorization support server 108 can generate a dynamic authorization data structure that includes a data structure storing a set of authorization elements retrieved at block 330. In some aspects, the data structure can include the data network identifier as an index for the set of authorization data. In additional or alternative aspects, the data structure can include a transaction identifier associated with a particular transaction (e.g., between the mobile device 102 and the host server system 104) for which the dynamic authorization data structure is being created. The transaction identifier, data network identifier, or both can be used by the host server system 104 to match a response from the identification-and-authorization system 101 to a particular request for authorization elements.

Generating the dynamic authorization data structure for transmission to the host server system 104 can allow the identification-and-authorization system 101 to dynamically provide the host server system with certain authorization data elements required for a transaction with mobile device 102. Generating the dynamic authorization data structure for transmission to the host server system 104 can also allow the identification-and-authorization system 101 to prevent the host server system 104 from accessing other certain authorization data elements, or other identification data stored in user data records 114, that are not required for the transaction with mobile device 102 and are therefore excluded from the dynamic authorization data structure.

In some aspects, block 340 can involve determining valid authorization elements based on characteristics of the authorization elements, an online transaction involving the mobile device within the interactive computing environment, or both. For instance, the identification-and-authorization service 110 can determine that a subset of authorization elements accessed at block 330 satisfies one or more validation conditions for completing or otherwise advancing the online transaction. In an illustrative example, certain authorization elements can include one or more credit card numbers that are expired, lack a sufficient credit limit for completing the online transaction, or are not accepted by the host server system 104. The identification-and-authorization service 110 can exclude these authorization elements from the dynamic authorization data structure generated at block 340. In additional or alternative aspects, the identification-and-authorization service 110 can determine additional or alternative subsets of identification data 118 that are valid. For example, the identification-and-authorization service can determine one or more addresses that are valid for delivery from a set of addresses associated with the user. The identification-and-authorization service 110 can exclude invalid authorization elements (e.g., addresses) from the dynamic authorization data structure generated at block 340.

In additional or alternative aspects, the identification-and-authorization service can receive transaction data associated with the online transaction from the host server system 104. One illustrative example of transaction data includes an identification of one or more types of authentication data elements accepted by the host server system 104 such as user names for accounts with certain access permissions, certain types of credit cards or payment options, etc. Other illustrative examples of the transaction data includes a cost of a product or service being traded or limitations on locations where the product or service can be delivered (e.g., a set of states in which a product can be delivered). The identification-and-authorization service 110 can use the transaction data to identify or generate validation conditions (e.g., credit card available balance, suitable delivery address, etc.) and exclude, from the dynamic authorization data structure, authorization elements that fail to meet these validation conditions.

In some aspects, the identification-and-authorization service 110 can include data in the dynamic authorization data structure that specifies an order of the authentication elements. For example, each authentication element record in the data structure can include a field indicating where, in the order, the authentication element should be positioned. The identification-and-authorization service 110 can thereby specify the order in which authentication elements (or corresponding authorization element selection data elements) should be presented at the mobile device 102.

The process 300 also involves causing the host server to use the dynamic authorization data structure to advance the online transaction within the interactive computing environment, as depicted in block 350. The remote authorization support server 108 can execute the identification-and-authorization service 110 and thereby perform one or more operations for implementing block 350, such as transmitting a control signal having dynamic authorization data structure to the host server system 104. In some aspects, the identification-and-authorization service 110 can configure a network interface device to transmit a suitable electronic communication (e.g., an Extensive Markup Language ("XML") document, a web page, an e-mail, etc.) to a host server system 104 that executes the interactive computing environment 105. In additional or alternative aspects, the identification-and-authorization service 110 can configure a network interface device to transmit a suitable electronic communication (e.g., an Extensive Markup Language ("XML") document, a web page, an e-mail, etc.) to mobile device 102 for use by a client application 103. In a simplified example, the transmitted dynamic authorization data structure can include valid payment data for use by the mobile device 102 during the online transaction.

Causing the host server to use the dynamic authorization data structure to advance the online transaction within the interactive computing environment can include one or more operations performed by the identification-and-authorization service 110 that result in at least one grant of access to the function at the mobile device 102. Examples of completing the function include accessing sensitive data from an access-controlled data source, completing a purchase via an e-commerce service, using a particular feature of an online software tool, etc. Identification data required for completing these functions could include, for example, providing a token indicating that a user is authorized to access certain data sources, providing name and address information required for a purchase, sending a confirmation that a user has permission to access a certain feature of a tool, etc.

The identification-and-authorization service 110 can automatically transmit a control signal to the host server system 104 that causes the host server system 104 to allow the mobile device to access the function. For example, a control signal could include the validated set of authorization elements. The identification-and-authorization service 110 can configure a network interface device of the identification-and-authorization system 101 to transmit the control signal to the host server system 104. The host server system 104 can perform, based on receiving the control signal, one or more operations for allowing the mobile device from accessing the function.

Examples of these operations include the host server system 104 providing a first graphical interface, such as a selection interface with authorization element selection data, to the mobile device 102 and providing, responsive to receiving an input via the first graphical interface that identifies an authorized data element, a second or updated graphical interface having one or more control elements for activating the function. The host server system 104 or mobile device 102 automatically fills the first graphical interface with authorization element selection data elements corresponding to the set of authorization elements in the dynamic authorization data structure. Automatically filling the first graphical interface can obviate the need to manually enter one or more authorization elements into the mobile device 102, to store one or more authorization elements into the mobile device 102, or both. Illustrative examples of control elements in the second or updated graphical interface include a "complete purchase" button or other suitable element for completing or advancing an online transaction within an interactive computing environment 105.

In some aspects, process 300 can include alternative operations for using the identification-and-authorization system 101 to perform third-party authorization support in online transactions between mobile devices 102 and host server systems 104. In some examples, the remote authorization support server 108 can determine a subset of authorization elements (e.g., access tokens, passwords, payment options, etc.) included in the identification data 118 that are unexpired. Transmitting the authorization elements can include restricting transmitted data to the subset of payment options that are unexpired. In additional or alternative aspects, the process 300 can include additional operations for using the identification-and-authorization system 101 to perform third-party authorization support. In some examples, the remote authorization support server 108 can receive, prior to the online transaction being completed, transaction data about the online transaction from the host server system 104. The transaction data can indicate at least a minimum amount of credit required or a list of types of authorization elements (e.g., particular credit card companies or banks) accepted by the host server system 104. Determining the valid identification data can include determining authorization elements based on the transaction data.

Examples of Computing Systems for Third-Party Authorization Support

Figure 4:
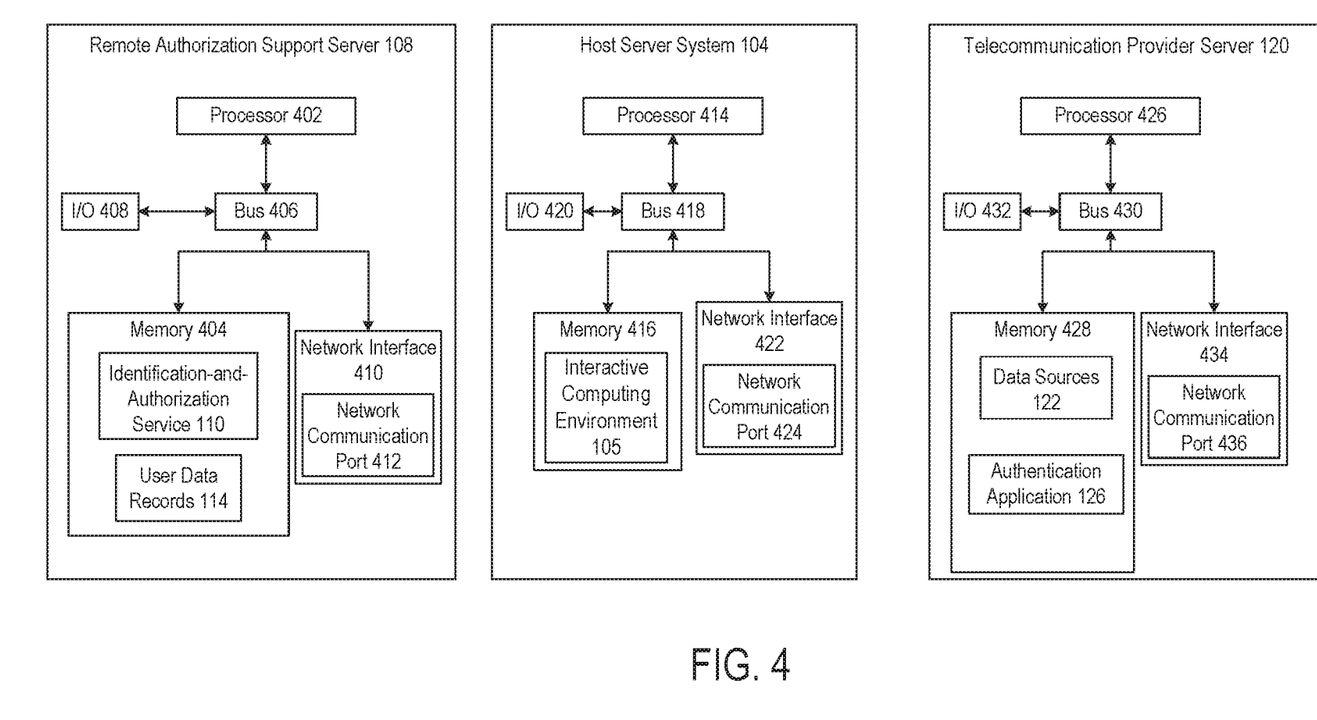
FIG. 4 depicts examples of computing systems for implementing certain aspects described herein.

Any suitable computing system or group of computing systems can be used to perform the third-party authorization support operations described herein. For example, FIG. 4 is a block diagram depicting an example of a remote authorization support server 108, a host server system 104, and a telecommunication provider server system 120. These examples can include various devices for implementing various systems and devices depicted in FIG. 1. The remote authorization support server 108 can include various devices for performing one or more operations described above with respect to FIGS. 1-3.

The remote authorization support server 108, the host server system 104, and the telecommunication provider server system 120 can respectively include processors 402, 414, and 426. The processors 402, 414, and 426 can be communicatively coupled to memory devices 404, 416, and 428, respectively. Each processor executes computer-executable program code stored in a communicatively coupled memory device, accesses information stored in the communicatively coupled memory device, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor include a microprocessor, an application-specific integrated circuit, a field-programmable gate array, or any other suitable processing device. The processor can include any number of processing devices.

Each of the memory devices 404, 416, and 428 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

Each of remote authorization support server 108, the host server system 104, and the telecommunication provider server system 120 can also include a number of external or internal devices such as input or output devices. For example, the remote authorization support server 108, the host server system 104, and the telecommunication provider server system 120 can respectively include buses 406, 418, and 430. A bus can communicatively couple one or more components of a given server system. The remote authorization support server 108, the host server system 104, and the telecommunication provider server system 120 can respectively include input/output interfaces 408, 420, and 432. The input/output interfaces 408, 420, and 432 can receive input from input devices or provide output to output devices.

The remote authorization support server 108 can execute program code that includes the identification-and-authorization service 110. The program code for the identification-and-authorization service 110 may be resident in any suitable computer-readable medium and may be executed on any suitable processing device. For example, as depicted in FIG. 4, the program code for the identification-and-authorization service 110 can reside in the memory device 404 at the remote authorization support server 108. Executing the identification-and-authorization service 110 can configure the processor 402 to perform the operations described herein with respect to FIGS. 1-3. In some aspects, the user data records 114 can also be stored in the memory device 404.

The host server system 104 can execute program code that includes the interactive computing environment 105. The program code for the interactive computing environment 105 may be resident in any suitable computer-readable medium and may be executed on any suitable processing device. For example, as depicted in FIG. 4, the program code for the interactive computing environment 105 can reside in the memory device 416 at the host server system 104. Executing the interactive computing environment 105 can configure the processor 402 to perform the operations described herein with respect to FIGS. 1-3.

The telecommunication provider server system 120 can execute program code that includes the authentication application 126. The program code for the authentication application 126 may be resident in any suitable computer-readable medium and may be executed on any suitable processing device. For example, as depicted in FIG. 4, the program code for the authentication application 126 can reside in the memory device 428 at the telecommunication provider server system 120. Executing the authentication application 126 can configure the processor 402 to perform the operations described herein with respect to FIGS. 1-3. In some aspects, the data sources 122 can also be stored in the memory device 428.

In some aspects, the remote authorization support server 108, the host server system 104, and the telecommunication provider server system 120 can respectively include network interface devices 410, 422, and 434. A network interface device can include any device or group of devices suitable for establishing a wired or wireless data connection to one or more data networks 106. Non-limiting examples of the network interface device include an Ethernet network adapter, a modem, etc. The network interface devices 410, 422, and 434 can respectively include one or more network communications ports 412, one or more network communications ports 424, and one or more network communications ports 436. An address or other identifier of a network communication port can used for communications with various other devices (e.g., a mobile device 102, a host server system 104, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," and "determining" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A computing system comprising:
   a telecommunication provider server configured for providing telecommunication service to a mobile device;
   a host server configured for conducting, with the mobile device, an online transaction within an interactive computing environment accessible over a data network; and
   an identification-and-authorization system communicatively coupled to (i) the host server via a first communication channel and (ii) the telecommunication provider server via a second communication channel that is out-of-band with respect to the first communication channel, wherein the identification-and-authorization system is configured for:
- obtaining, via the first communication channel, a data network identifier that identifies the mobile device,
- obtaining, from communications with the telecommunication provider server via the second communication channel, a credential corresponding to the data network identifier,
- matching the credential to a set of multiple authorization elements, wherein each of the authorization elements is configured to provide the mobile device with access to a function for advancing the online transaction within the interactive computing environment,
- generating a dynamic authorization data structure comprising (i) the data network identifier and (ii) the set of multiple authorization elements, and
- automatically transmitting, to the host server, a control signal having the dynamic authorization data structure, wherein the host server is further configured for:
- providing a selection interface to the mobile device, wherein the selection interface presents partially masked versions of the authorization elements, and
- advancing, responsive to receiving a selection of one of the partially masked versions of the authorization elements from the mobile device, the online transaction within the interactive computing environment.

2. The computing system of claim 1, wherein the second communication channel is out-of-band with respect to the first communication channel, wherein the identification-and-authorization system is configured to communicate via the first communication channel and the second communication channel during a same time period.

3. The computing system of claim 1, wherein the identification-and-authorization system is further configured for:
receiving, via the first communication channel and prior to the online transaction being completed, transaction data about the online transaction from the host server, the transaction data indicating a validation condition indicating a type of authorization element accepted by the host server, wherein generating the dynamic authorization data structure comprises excluding, from the set of multiple authorization elements included in the dynamic authorization data structure, other authorization elements matching the credential and lacking the type of authorization element.

4. The computing system of claim 1, wherein generating the dynamic authorization data structure comprises excluding, from the set of multiple authorization elements included in the dynamic authorization data structure, expired authorization elements matching the credential.

5. The computing system of claim 1, wherein generating the dynamic authorization data structure comprises specifying, in the dynamic authorization data structure, an order of authorization elements to be presented at the mobile device.

6. The computing system of claim 5, wherein the identification-and-authorization system is configured for identifying the order of authorization elements based on one or more of a user preference associated with a user of the mobile device, a preference specified by the host server, and a frequency of use of one or more authorization elements.

7. A method in which one or more processing devices of an identification-and-authorization system perform operations comprising:
- obtaining, via a first communication channel to a host server, a data network identifier that identifies a mobile device involved in an online transaction within an interactive computing environment provided by the host server;
- obtaining, from communications with a telecommunication provider server via a second communication channel, a credential corresponding to the data network identifier;
- matching the credential to a set of multiple authorization elements, wherein each of the authorization elements is configured to provide the mobile device with access to a function for advancing the online transaction within the interactive computing environment;
- generating a dynamic authorization data structure comprising (i) the data network identifier and (ii) the set of multiple authorization elements;
- automatically transmitting, to the host server, a control signal having the dynamic authorization data structure; and
- causing, via the control signal, the host server to (i) present, to the mobile device, an interface having one or more partially masked versions of the authorization elements and (ii) advance, responsive to receiving a selection from the mobile device identifying one of the partially masked versions of the authorization elements, the online transaction within the interactive computing environment.

8. The method of claim 7, wherein generating the dynamic authorization data structure comprises excluding, from the set of multiple authorization elements, additional authorization elements, wherein the identification-and-authorization system prevents the host server from accessing the additional authorization elements that have been excluded.

9. The method of claim 8, the operations further comprising receiving, via the first communication channel and prior to the online transaction being completed, transaction data about the online transaction from the host server, the transaction data indicating a validation condition indicating a type of authorization element accepted by the host server, wherein the additional authorization elements excluded from the dynamic authorization data structure comprise other authorization elements matching the credential and lacking the type of authorization element.

10. The method of claim 8, wherein the additional authorization elements excluded from the dynamic authorization data structure comprise expired authorization elements matching the credential.

11. The method of claim 7, wherein generating the dynamic authorization data structure comprises specifying, in the dynamic authorization data structure, an order of authorization elements to be presented at the mobile device.

12. The method of claim 11, further comprising identifying the order of authorization elements based on one or more of a user preference associated with a user of the mobile device, a preference specified by the host server, and a frequency of use of one or more authorization elements.

13. The method of claim 7, wherein the second communication channel that is out-of-band with respect to the first communication channel, wherein the identification-and-authorization system is configured to communicate via the first communication channel and the second communication channel during a same time period.

14. A non-transitory computer-readable medium storing instructions executable by a processing device, the processing device communicatively coupled to a network interface device and the non-transitory computer-readable medium, wherein the processing device is configured to execute the instructions and thereby perform operations comprising:
- obtaining, via a first communication channel, a data network identifier that identifies a mobile device involved in an online transaction within an interactive computing environment provided by a host server,
- obtaining, from communications with a telecommunication provider server via a second communication channel, a credential corresponding to the data network identifier,
- matching the credential to a set of multiple authorization elements, wherein each of the authorization elements is configured to provide the mobile device with access to a function for advancing the online transaction within the interactive computing environment,
- generating a dynamic authorization data structure comprising the set of multiple authorization elements,
- automatically transmitting, to the host server, a control signal having the dynamic authorization data structure, and
- causing, via the control signal, the host server to (i) present, to the mobile device, an interface having one or more partially masked versions of the authorization elements and (ii) advance, responsive to receiving a selection from the mobile device identifying one of the partially masked versions of the authorization elements, the online transaction within the interactive computing environment.

15. The non-transitory computer-readable medium of claim 14, wherein generating the dynamic authorization data structure comprises excluding, from the set of multiple authorization elements, additional authorization elements,
wherein the operations further comprise preventing the host server from accessing the additional authorization elements that have been excluded.

16. The non-transitory computer-readable medium of claim 15, the operations further comprising receiving, via the first communication channel and prior to the online transaction being completed, transaction data about the online transaction from the host server, the transaction data indicating a validation condition indicating a type of authorization element accepted by the host server, wherein the additional authorization elements excluded from the dynamic authorization data structure comprise other authorization elements matching the credential and lacking the type of authorization element.

17. The non-transitory computer-readable medium of claim 15, wherein the additional authorization elements excluded from the dynamic authorization data structure comprise expired authorization elements matching the credential.

18. The non-transitory computer-readable medium of claim 14, wherein generating the dynamic authorization data structure comprises specifying, in the dynamic authorization data structure, an order of authorization elements to be presented at the mobile device.

19. The non-transitory computer-readable medium of claim 18, wherein the operations further comprise identifying the order of authorization elements based on one or more of a user preference associated with a user of the mobile device, a preference specified by the host server, and a frequency of use of one or more authorization elements.

20. The non-transitory computer-readable medium of claim 14,
wherein the network interface device is communicatively coupled to the host server via the first communication channel and to the telecommunication provider server via the second communication channel,
wherein the second communication channel is out-of-band with respect to the first communication channel.

* * * * *